United States Patent [19]
Holzer

[11] Patent Number: 4,951,446
[45] Date of Patent: Aug. 28, 1990

[54] METHOD FOR MAKING FOIL PACKAGING

[76] Inventor: Walter Holzer, Drosteweg 19, Meersburg, Fed. Rep. of Germany, 7758

[21] Appl. No.: 293,317

[22] Filed: Jan. 4, 1989

[51] Int. Cl.⁵ .................. B65B 7/02; B65B 51/30; B65B 61/18
[52] U.S. Cl. .......................... 53/412; 53/479; 383/94
[58] Field of Search ........... 53/133, 226, 412, 468, 53/479, 477; 383/35, 94, 120

[56] References Cited

U.S. PATENT DOCUMENTS

| | | | |
|---|---|---|---|
| 1,470,172 | 10/1923 | Labombarde | 383/35 X |
| 2,189,174 | 2/1940 | Hohl | 383/35 X |
| 3,038,283 | 6/1962 | Unger | 53/479 X |
| 3,041,802 | 7/1962 | Cummings et al. | 383/94 X |
| 3,133,392 | 5/1964 | West | 53/226 |
| 3,189,253 | 6/1965 | Mojonnier | 383/35 X |
| 3,432,980 | 3/1969 | Seiferth et al. | 53/479 X |
| 4,254,601 | 3/1981 | Prager et al. | 53/133 |
| 4,480,751 | 11/1984 | Lueptow | 383/94 X |
| 4,725,329 | 2/1988 | Tani | 53/412 X |

Primary Examiner—Robert L. Spruill
Assistant Examiner—Linda B. Johnson
Attorney, Agent, or Firm—Baker, Maxham, Jester & Meador

[57] ABSTRACT

A method for making easily openable foil packages. The method comprises the step of forming a longitudinal seam and a transverse seam intersecting with each other, thereby providing grip surfaces which, when pulled apart, break the seal. The apparatus for forming the seam comprises bifurcated tool elements which come together in two orthogonal steps. The package so formed by the apparatus operating in accordance with the method is also novel.

10 Claims, 3 Drawing Sheets

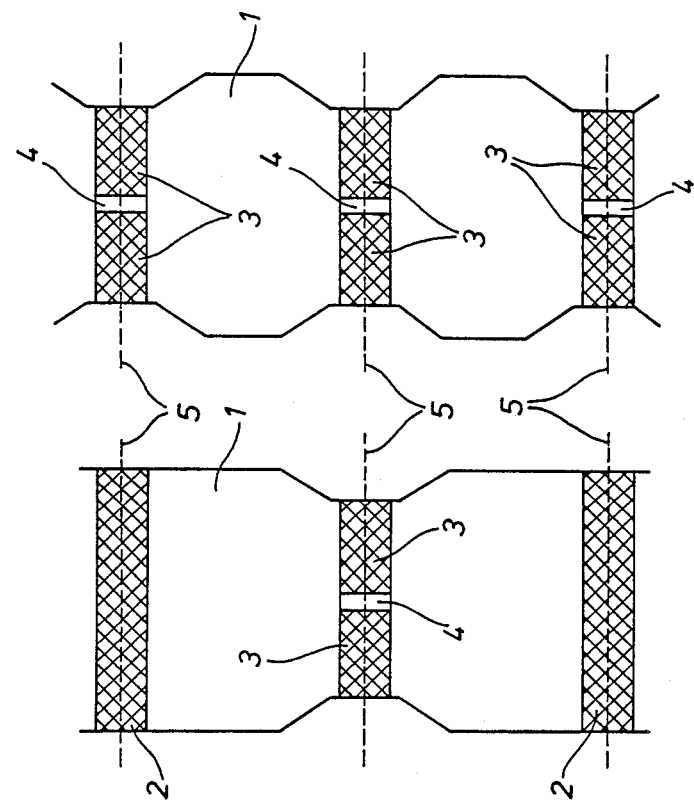
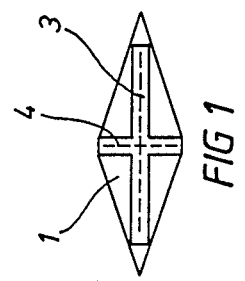
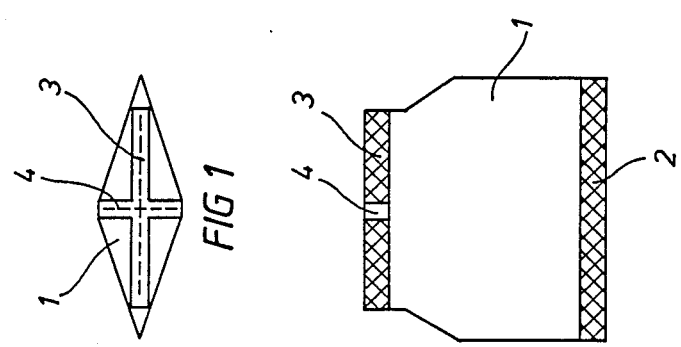

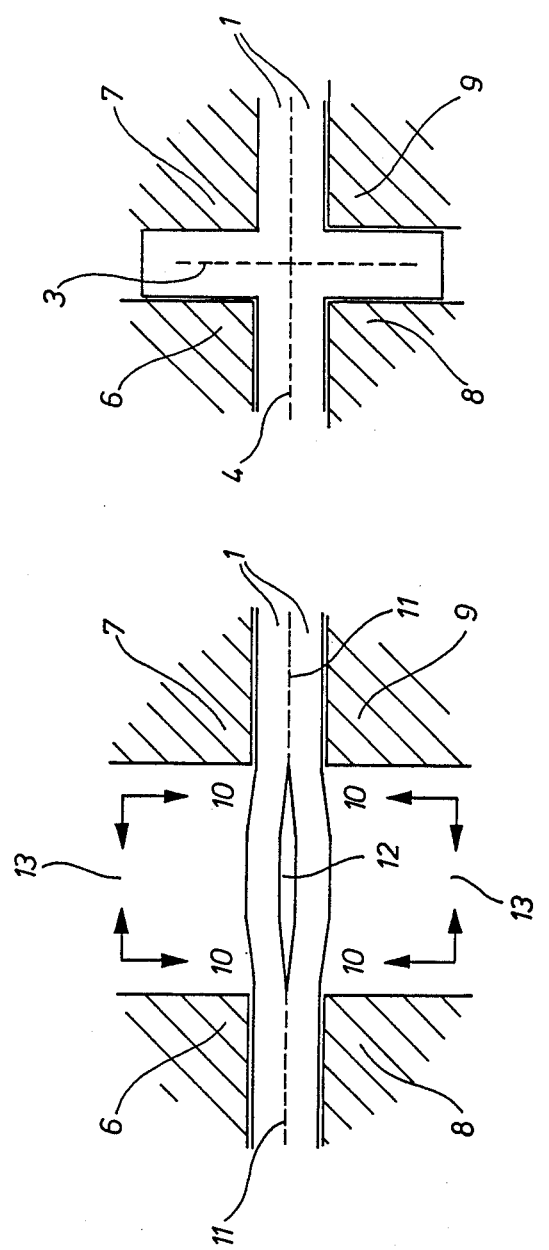

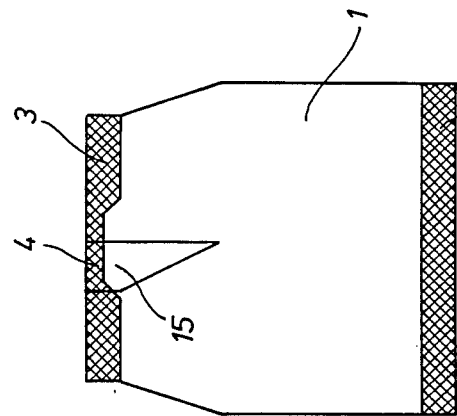
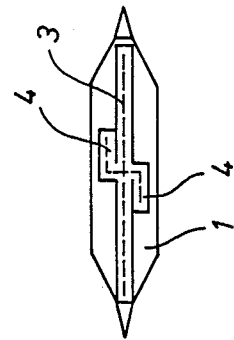
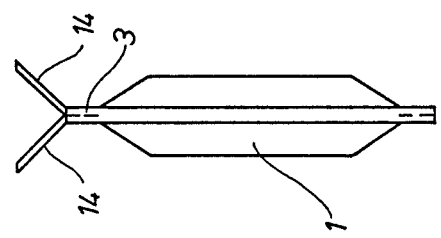
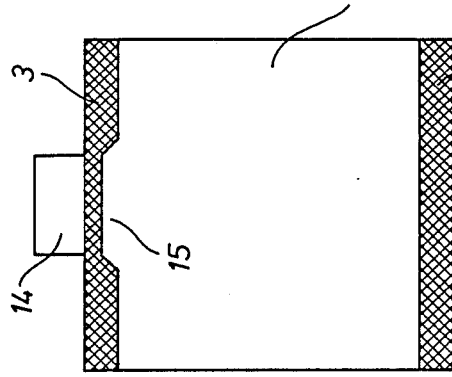
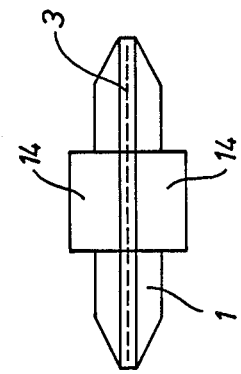
FIG 7 (PRIOR ART)
FIG 8 (PRIOR ART)
FIG 9 (PRIOR ART)
FIG 10
FIG 11

METHOD FOR MAKING FOIL PACKAGING

FIELD OF THE INVENTION

This invention relates generally to packaging and more particularly concerns a novel method and apparatus for making foil packages which are securely sealed but easily torn open.

BACKGROUND OF THE INVENTION

Foil packages often have the characteristic that the user has difficulties opening them. Notches and nominal break points are of help only in rare cases, and scissors or other tools are not always at hand. In some instances protruding tabs are built into the seam to aid in opening the package.

The attempts to facilitate and ease the opening of foil packages have not universally reduced the frustration often felt when attempting to open such a package. In some instances those attempts to make the package readily openable have served to weaken the seal itself, before it is to be opened.

SUMMARY OF THE INVENTION

A primary objective of this invention is to provide a process which guarantees problem-free opening of tear-open foil packages. The process is suitable for package contents which are solid and liquid as well as gaseous materials or mixtures thereof.

In accordance with this invention the above objective is accomplished by providing grip surfaces transverse to the welding seam, that is, when the package is torn open, the welding seam is torn instead of the foil material itself. Thus it is possible to use very strong, tough foil material, which previously presented the biggest difficulties during opening. The welding seams which often require a lot of force to tear open can much more easily be adapted to the sealing and opening requirements than can the foil material, for instance, by means of respective "nominal break points." This invention allows the bond between the package sides at the seal to be as secure as necessary while permitting ease of separation when positive forces are applied to break the bond.

A special design of the grip surfaces results, in accordance with the invention, in giving the welding seam for closing the foil package a cross shape, whereby either the longitudinal seam or the transverse seam, or both, are developed as grip surfaces.

In accordance with the invention it is disclosed to use a welding device with elements divided in cross shape and which first closes in the direction normal to the foil surface and then in the direction parallel to the foil surface, thus closing the packaging with a cross-shaped welding edge. Thus it becomes possible to hold the grip surfaces formed by the welding edges on two ends opposite each other and, consequently, to tear open the transverse welding edge by pulling the grip surfaces apart.

It is further disclosed to provide the cross-divided tool with cutting edges which, following the welding process, separate the cross-wise folded welding seam between adjacent bags. The application of this process is particularly simple for a foil package for which a semi-tube or full tube is used as base material and where the transverse welding seams are folded in cross shape. For such a design it is not necessary that each of the transverse welding seams is folded in cross shape, but only that every second seam be so constructed, so that a cross-shaped welding seam alternates with a normal transverse welding seam.

For the design of such a foil package it may be useful to provide grip reinforcements at the welding seam, which is easily accomplished, for instance by a wave-shaped welding seam. Thus the mating surfaces of the tool elements can be made with any desired texture to provide the preferred grip reinforcements. Easy opening of a foil package in accordance with the invention is further facilitated by designing at least one area of the folded welding seam as a nominal break point, which should optimally be located close to the crossing point. For better stacking and handling, an alternative embodiment is to fold the laterally protruding parts of the cross-shaped welding seam onto the surface.

BRIEF DESCRIPTION OF THE DRAWING

The objects, advantages and features of the invention will be more readily perceived from the following detailed description, when read in conjunction with the accompanying drawing in which:

FIG. 1 is a top view of a package closed in accordance with the invention;

FIG. 2 is a side view of the package of FIG. 1;

FIG. 3 shows how a tube base material is employed with the teachings of the invention;

FIG. 4 shows an alternative manner of using a tube base material;

FIG. 5 schematically shows tool elements making the first seam;

FIG. 6 shows the tool elements of FIG. 5 making the transverse seam;

FIG. 7 shows a conventional welding seam equipped with a nominal break area and tabs to facilitate opening the package;

FIG. 8 is an edge view of the package of FIG. 7;

FIG. 9 is a top view of the FIG. 7 package;

FIG. 10 shows the package of FIG. 1 with the transverse grip surfaces folded onto the main welding seam; and FIG. 11 is a top view of the package of FIG. 10.

DESCRIPTION OF THE PREFERRED EMBODIMENTS

With reference now to the drawing, and more particularly to FIGS. 7, 8 and 9, there is shown foil package 1 with conventional welding seam 3 which is further equipped with externally applied tabs 14 to facilitate tearing of the side welding seam. To further enhance the ease of tearing a nominal break area 15 is built into welding seam 3.

FIGS. 1 and 2 show an example of a welded foil bag constructed in accordance with the invention. The cross-shaped weld is clearly identified in these views. For reasons of simplification the examples employed herein are based on using a full tube as the base material. Foil tube 1 is closed at the lower end by transverse welding seam 2 and welding seam 3 as well as transverse welding seam 4 are shown at the top.

FIG. 3 shows the alternating of conventional transverse welding seams 2 and cross-folded welding seams 3 and 4. The completely closed foil bags are then separated at edges 5. The advantage of the sequence shown in FIG. 3 is mainly that prior to applying the cross-shaped folding of welding seams 3 and 4 foil tube 1 can be filled between seams 2, for instance with liquids, without the danger of liquid spilling during the cross-shaped folding and welding process.

The same obviously applied to the alternative arrangement shown in FIG. 4, where all transverse welding seams are continuously done in cross-shaped foldings. The number identification for the same parts in FIGS. 3 and 4 is identical.

FIG. 5 is a schematic view of a welding tool used for forming cross-shaped folded welding seams according to the invention. The welding fixture consists of four cross-divided jaws 6, 7, 8 and 9. The pair 6 and 7 jaws and the pair 8 and 9 jaws are first moved in direction 10 normal to foil tube 1, in order to first complete welding seams 11. Foil tube 1 is not yet welded in the area 12. By closing jaws by pairs 6, 8 and 7, 9 in direction 13, that is, parallel to the foil surface, the foil tube is folded and welded as shown in FIG. 6. It is advantageous to divide the jaws 6, 7, 8 and 9 also at the separating line 5 (FIGS. 3 and 4), whereby the completely welded bags can be separated from each other by simply sliding these jaws against each other. That would entail lateral splitting of the jaws parallel to the top view of FIGS. 5 and 6 so that, with tube portions above and below that split, after the action shown in these two figures the lateral sliding, preferably on a diagonal, severs the newly created sealed packages FIGS. 10 and 11 show foil bag 1 in accordance with the invention with crossed welding seams 3 and 4, whereby transverse seams 4 are folded onto main welding seams 3. This provides for improved stacking and handling of the packages.

The schematics in FIGS. 1 through 11 do not attempt to be complete or exhaustive since the principle of the folded cross-shaped welding edges allows a multitude of geometric arrangements, which cannot all be shown. However, the examples shown not only demonstrate the simplicity of the solution but also clearly give the basic principle, so that they explain the wide area of protection of the invention. Although described in terms of foil packages, the invention is applicable to any "tear open" packages, many of which are made of plastic materials or cellophane. In view of the above description, it is likely that modifications and improvements will occur to those skilled in the art which are within the scope of the appended claims.

What is claimed is:

1. A method for producing tear open packaging for solid, liquid and gaseous material from packaging material which is elongated and has first and second ends and opposite longitudinal edges, one end being open for access to the interior thereof, said method comprising the steps of:
   forming a first welding seam of the mutually confronting packaging material from the opposite longitudinal edges partially across the open end of the packaging material, the unwelded portion being located intermediate the longitudinal edges of packaging material; and
   forming a second welding seam transverse to the first seam, the second seam being formed from the unwelded mutually confronting packaging material;
   the first seam being formed by means of a cross-wise divided plural element welding tool which closes on the packaging material in a direction normal to the surface of the packaging material, leaving the unwelded portion thereof;
   the second seam being formed by means of the welding tool which then closes in a direction parallel to the packaging material surface, thus producing a cross-shaped welding edge;
   thereby forming grip surfaces to facilitate splitting the welding seam without requiring tearing of the packaging material.

2. The method recited in claim 1, wherein the cross-shaped welding edge formed of the first and second seams is shaped and configured to define grip surfaces.

3. The method recited in claim 2, wherein the seams are provided with at least one nominal break point.

4. The method recited in claim 2, wherein the laterally protruding portion of the second seam is folded onto the adjacent surface of the first seam.

5. The method recited in claim 1, wherein the packaging material is continuous and the welding tool is formed with cutting edges adapted to separate the welding seam between adjacent packages following the sealing process.

6. The method recited in claim 1, wherein the packaging material comprises a tube and the second welding seam forms a cross-shaped configuration with respect to the first welding seam and the second welding seams are folded against the packaging material surface.

7. The method recited in claim 1, wherein the transverse seam is folded onto the longitudinal seam.

8. The method recited in claim 1, wherein the welding seams have grip surface reinforcements comprising an external surface texture on the seams.

9. The method recited in claim 1, wherein the seams are provided with at least one nominal break point.

10. The method recited in claim 1, wherein the laterally protruding portion of the second seam is folded onto the adjacent surface of the first seam.

* * * * *